United States Patent [19]

Bernard et al.

[11] Patent Number: 4,864,310

[45] Date of Patent: Sep. 5, 1989

[54] ADAPTIVE ANTENNA SYSTEM FOR RADIO WAVES, IN PARTICULAR FOR MICROWAVES

[75] Inventors: Jean-Jacques Bernard, Vert Le Grand; Jean Robieux, Chatenay Malabry, both of France

[73] Assignee: Societe Anonyme dite Compagnie Generale d'Electricite, Paris Cedex, France

[21] Appl. No.: 186,857

[22] Filed: Apr. 27, 1988

[30] Foreign Application Priority Data

Apr. 27, 1987 [FR] France ............................... 87 05907

[51] Int. Cl.[4] ......................... H01Q 3/22; H04B 9/00

[52] U.S. Cl. ....................................... 342/368; 370/3; 455/612

[58] Field of Search ....................... 342/368, 371, 372; 455/617, 607, 606, 612; 370/3, 1

[56] References Cited

U.S. PATENT DOCUMENTS

| | | | |
|---|---|---|---|
| 3,878,520 | 4/1975 | Wright et al. | 455/612 |
| 4,198,117 | 4/1980 | Kobayashi | 370/3 |
| 4,736,463 | 4/1988 | Chauez | 455/607 |

OTHER PUBLICATIONS

Wallington et al., "Optical Techniques for Signal Distribution in Phased Arrays", Gec Journal of Research, vol. 2, No. 2, 1984, pp. 66-75.

Soref: "Voltage-Controlled Optical/RF Phase Shifter", Journal of Lighwave Technology, Oct., No. 5.

G.E.C. Journal of Research, vol. 2, No. 2, 1984, pages 66-75, Londres, GB; J.R. Wallington et al.: "Optical techniques for signal distribution in phased arrays".

Proceedings of the 1979 International Symposium on Circuits and Systems, sponsored by the IEEE Circuits and Systems Society etc., 17-19 Jul. 1979, Tokyo, pp. 735-738; Kiyoshi Nosu et al.: "A Design of Multiplexers for Optical Wavelength-Division Multiplexing Transmission Via a Single Fiber".

*Primary Examiner*—Thomas H. Tarcza
*Assistant Examiner*—Gregory C. Issing
*Attorney, Agent, or Firm*—Sughrue, Mion, Zinn, Macpeak & Seas

[57] ABSTRACT

The antenna includes at least one group of antenna elements (EA1, EA2, . . . , EAp). Microwaves emitted by a central emitter (EH) reach a particular element (EA1 for example) by passing through a controllable phase shifter (VE1), a laser (LE1) which modulates a carrier light signal at a frequency specific to said antenna element with the microwaves, via an optical deflector (FIE) which injects said light signal into an optical waveguide (GE) which is common to all of the antenna elements in the group, via an optical deflector (FPE) which directs said light signal to a detector which is specific to said antenna element (EA1), and which reconstitutes the microwaves, and via a microwave amplifier (AE1) which applies the microwaves to said antenna element. The system is applicable to telecommunications and to radar.

4 Claims, 4 Drawing Sheets

ADAPTIVE ANTENNA SYSTEM FOR RADIO WAVES, IN PARTICULAR FOR MICROWAVES

The present invention relates to an adaptive antenna system for radio waves, and in particular for microwaves.

BACKGROUND OF THE INVENTION

An antenna system is said to be adaptive when, a fixed transmission antenna is capable of modifying the direction of the beam radiated from the antenna. If the antenna is used for reception, then beams can be received from various directions, with a single one of said beams being selected by a central member of the system, and with an adaptive system making it possible to modify the direction of the beam selected in this way. The antenna may, naturally, also be a moving antenna. In this case an adaptive system makes it possible to modify the direction of the beam relative to the antenna. Such directional adaptation can be accompanied by adaptation of the shape of the radiation pattern.

The advantage of performing such adaptations stems, in particular, from the fact that electromagnetic waves and in particular microwaves are widely used in telecommunications and are also used for electromagnetically detecting the positions and the shapes of objects by systems known as radars. In both of these two important classes of application, it appears to be useful to have antennas available whose radiation can be adapted as a function of changes over time in the task to be accomplished.

For example, a telecommunications satellite must be able to transmit information between points on a determined region of the Earth. The antenna must illuminate or continually point at said region in spite of the satellite's motion in translation and in rotation. In order to obtain optimum efficiency in a telecommunications system it is necessary to cause the antenna beam to move so that it permanently illuminates the area within which communications are to be established.

A radar is more effective if the antenna beam can be flexibly and rapidly pointed towards the various targets aimed at, i.e. towards those targets which it is particularly desired to observe.

It is thus desirable, at least in these two types of application, to have an adaptive antenna system available. In addition, it is often desirable for the system to be selfadapting, i.e. it should adapt automatically under the action of the signals emitted or returned by the target.

Various adaptive antenna systems are known in which it is possible to adapt the radiation pattern of an array for a specific purpose by acting on the amplitude and the phase of the radiating sources (J. E. Hudson, "Adaptive array principles", IEE Electromagnetic Waves Series, No. 11, 1981, Peter Peregrinus Ltd.). A particularly important application for space techniques is rejecting jamming (M. Cohen, "Etude theorique et experimentale d'une antenne reseau adaptative", i.e. "Theroetical and experimental study of an adaptive array antenna", Engineering PhD thesis number 82, 1983, at Ecole Nat. Sup. Aéronautique Espace), and (M. Cohen, P. F. Combes, and J. C. Magnan, "Adaptive array antenna performances", Minutes of the 4th Int. Conf. on Antennas and Propagation, April 1985, Warwick, pp. 241-245, IEE Conf. Publ.).

In this case, a link is characterized by the ratio (Q) of the signal (S) divided by noise (B) plus interference (I), with the source of interference being assumed to be located in the field of view of the antenna, i.e.:

$$Q=S/(B+I)$$

For each jamming configuration, adaptation methods exist which make it possible to find a feed relationship for the n sources of an antenna which minimizes degradation of the useful signal and optimizes the ratio Q (S. Applebaum, "Adaptive arrays", IEEE Trans. Ant. and Prop. (USA), AP. 24, No. 5, September 1976).

These systems suffer, in particular, from the drawback of being relatively complex, expensive, and heavy.

A particular object of the present invention is to provide an adaptive antenna system for radio waves, in particular for microwaves, which is simpler, and/or lighter, and/or less expensive than prior art systems.

SUMMARY OF THE INVENTION

The present invention provides an adaptive antenna system for radio waves, said system comprising:

an antenna constituted by a plurality of antenna elements distributed over a surface in a "peripheral" zone of the system, each of said elements being capable of emitting and/or receiving a fraction of the wave energy propagating in the external free space at at least one commmon predetermined radio frequency and along aiming directions distributed in three dimensions, each of said elements coupling said wave energy to a peripheral radio signal at the same frequency propagating within the system and corresponding to said element;

a peripheral radio waveguide also corresponding to said element for transmitting said radio signal;

a peripheral transformation member corresponding to said antenna element and disposed on the corresponding peripheral waveguide to couple said peripheral radio signal to a light signal corresponding to said antenna element, said coupling being performed by modulating or demodulating said signal;

an interzone optical waveguide connecting said peripheral zone to an "internal" zone of the system for transmitting said light signals;

an internal transformation member corresponding to said antenna element in order to couple said light signal by demodulation or modulation to an internal radio signal also corresponding to said antenna element;

an internal radio waveguide also corresponding to said element for transmitting said internal radio signal, said internal radio waveguide and transformation member, said optical waveguide, and said peripheral transformation member and radio waveguide constituting portions of a composite line corresponding to said element; and a central member for emitting and/or receiving radio signals to or from said internal radio waveguides, thereby coupling said central member to each of the antenna elements via a corresponding composite line;

said system further including, on each of said composite lines, at least one phase control member corresponding to the same antenna element and controlling the phase of said peripheral radio signal relative to said internal radio signal to enable a particular aiming direction to be selected from a plurality thereof and to adapt the selected aiming direction of the system on command, said adaptation being due to the fact that it is only external wave energy propagating along said direction for which the various fractions of said wave energy passing through the various antenna elements are coupled inphase at said central member;

said system including the improvement whereby said interzone optical waveguide is common to at least one group of said antenna elements, with the light signals corresponding to the various antenna elements of said group being at different frequencies, and the system further including two light deflectors, namely a peripheral deflector and an internal deflector, which deflectors deflect light through an angle depending on its frequency and are common to all of the antenna elements of the group for coupling the peripheral and internal ends of said common optical waveguide to the various peripheral and internal transformation members which respectively correspond to the various elements of said group.

Preferably, said antenna elements are both-way elements capable both of emitting and of receiving said external wave energy, the system including in conjunction with each of said antenna elements:

a both-way peripheral radio waveguide connected to said element;

an emission peripheral radio waveguide;

a reception peripheral radio waveguide; and a circulator for coupling said emisson waveguide to said both-way waveguide for emission radio signals, and for coupling said both-way waveguide to said reception waveguide for reception radio signals, said element corresponding to two of said composite paths, namely an emission path and a reception path, and both of said paths having said both-way peripheral radio waveguide and said circulator in common, with the other ones of said members of said two paths being distinct.

In a variant, said phase control member is an optical phase shifter placed on an optical phase-shifting length of each of said composite paths, said length receiving a light signal at a frequency specific to said path, said internal transformation member modulating or demodulating an equivalent light signal on a transformation optical length connected in parallel with said phase-shifting length.

BRIEF DESCRIPTION OF THE DRAWINGS

Embodiments of the invention are described by way of example with reference to the accompanying drawings, in which.

MORE DETAILED DESCRIPTION

Figure 1:
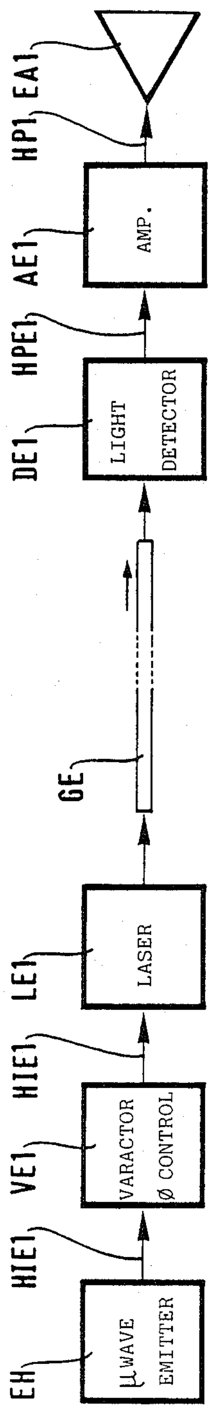
FIG. 1 is a block diagram of a composite emission path in a first system in accordance with the invention.

When the same item appears in two or more figures, it is designated by the same reference in all of them.

The present invention makes use, e.g. for emitting microwave radiation, of a new method of distributing the amplitude and the phase of the electromagnetic wave over the surface of the antenna, thereby making it possible for the radiated beam to be self-adapting. It makes use of the properties of optical waveguides and of semiconductor lasers whose frequency may be selected to match the material used.

In a telecommunications satellite, the self-adapting beam control system must be lightweight regardless of the size of the antenna, which may be large. The system must be highly reliable and its price must be acceptable. In all applicatons these characteristics are essential.

In accordance with the invention, an optical method of distributing the amplitude and the phase of microwaves gives rise to systems which are lightweight, efficient, and at a price which is often acceptable.

The principle used is as follows:

a microwave signal or "wave" is produced in a central member situated in the above-mentioned "internal" zone, and said wave is distributed to the surface of the antenna via optical wavegudies.

The phase, and optionally the amplitude, of the field at each point on the antenna is/are determined in said internal zone either by acting directly on the microwave signal, or else by acting on an optical wave.

The essential novelty of the invention is to take advantage of the possibilities provided by optics for distributing the microwave field over the surface of the antenna in a manner which is simple, lightweight, and cheap. The amplitude and the phase of the wave are generated in the internal zone by microwave methods or by optical methods. The amplitude and the phase of the wave are monitored by electronic methods making it possible for the radiated beam to self-adapt quickly.

We begin by calculating the number of elementary sources that need exciting independently on the radiating surface as a function of the wavelength L, the diameter a of the surface, and the angle A within which the beam direction is to be selectable. Each of the sources is constituted by one of said antenna elements. Thereafer we describe the structure of a composite path corresponding to one element, and then we describe a complete system.

The number n of elementary sources to be excited on the radiating surface is determined as follows:

If all of the antenna elements are excited in phase, radiation is at a maximum in the normal direction to the plane of the antenna. The width $2B_0$ of the angle within which the energy is radiated is given by the laws of diffraction, i.e.:

$$(4)\ 2B_0=L/a$$

Assume that the surface of the antenna is divided into square elements of side b. Select the phase at the center of each of these elements to be such that the radiation from the antenna is oriented in a direction at an angle $B_1$ to the normal. In order for radiation in said direction to be possible with a radiation pattern of adequate quality, it is necessary for the Rayleigh condition to be satisfied. The surface of the wave built up from the elementary sources of side b must not deviate by more than L/4 from a plane perpendicular to the direction defined by the angle $B_1$. The following condition must therefore be satisfied:

$$B_1.b/2\leqq L/4$$

The minimum number of elementary sources is therefore given by:

(4') $b=L/2B_1$ (5) Thus: $n=(a/b)^2=(a/L)^2/(b/L)^2=B_1^2/B_0^2$

It can thus be observed that the radiating properties of an antenna may be characterized by two parameters:

$2B_0$: width of the radiated beam; and $2B_1$: width of the angle within which the direction of radiation can be varied.

The ratio $(B_1/B_0)^2$ is given by equation (5). It is equal to the number n of elementary sources which are to be fed independently.

Consider, by way of example, an antenna radiating at L=5 cm and having a diameter a=1 meter (m). The width $2B_0$ of the emitted beam is:

$2B_0=0.05$ radians, i.e. about 3°.

Equation (5) makes it possible to determine the ratio $B_1/B_0$ by using the equality $(B_1/B_0)^2=n$.

| | |
|---|---|
| If n = 10 | $2B_1$ = 0.15 rad = 10° |
| n = 100 | $2B_1$ = 0.45 rad = 30° |
| n = $10^3$ | $2B_1$ = 1.5 rad = 90° |

With such a typical antenna, the beam may be moved over a range of 10° if n=10, or of 30° if n=100. These orders of magnitude correspond to angles which are wide enough for important applications. We give particular attention to the cases where n=10 and n=100.

Figure 2:
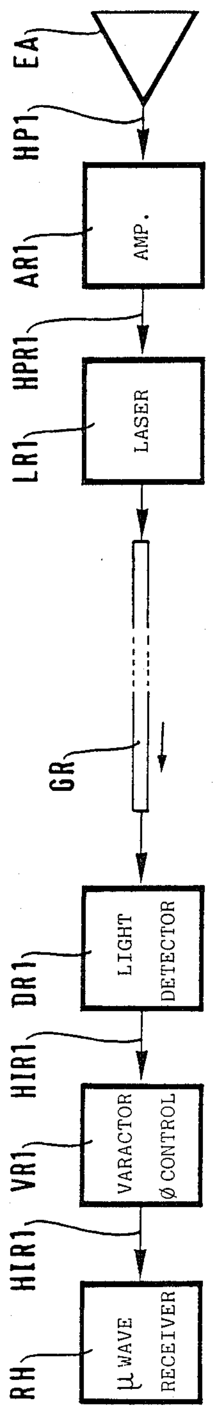
FIG. 2 is a block diagram of a composite reception path in the same system.

The amplitude and the phase of an elementary source are controlled by taking the following into consideration:

The diagrams of FIGS. 1 and 2 show the means for excitation of an elementary source and for reception from an elementary receiver at an amplitude and a phase which are electrically controllable, said source and said receiver both being constituted by the same antenna element EA1. Taken together, these means constitute the composite emission and reception paths mentioned above and corresponding to said element.

In emission (see FIG. 1) a microwave emitter EH constitutes the above-mentioned central member. In reception, said member is constituted by a receiver RH (see FIG. 2).

Figure 3:
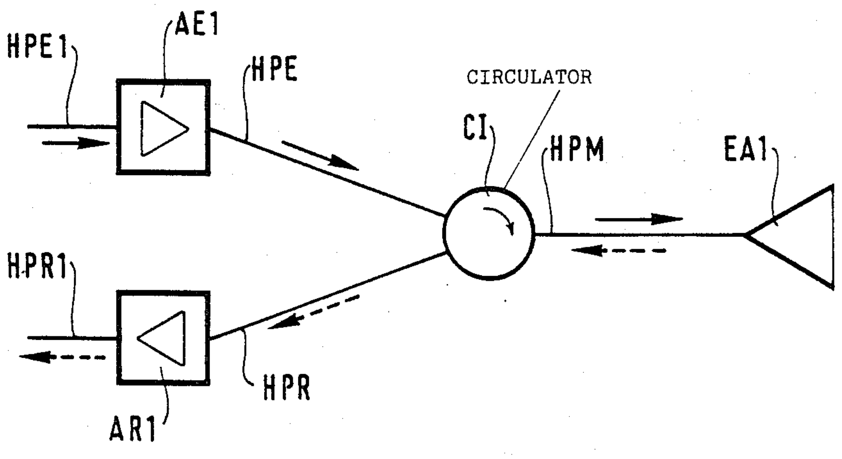
FIG. 3 is a block diagram of a peripheral portion which is partially common to both said paths.

The emitted wave propagates from the microwave emitter to the antenna element EA1 from which it is radiated. The wave received at EA1 propagates towards the receiver RH. In said peripheral zone, i.e. in the proximity of the antenna, the emitted and received waves are directed over different routes by a non-reciprocal junction CI, referred to as a "circulator" and containing ferrites, for example. These routes followed by the emitted and received waves are shown diagrammatically in FIG. 3.

The following are required for controlling the amplitude and the phase of an antenna element EA1:

In the emission path:

an emitter EH for emitting a microwave signal which is modulated by the information signal to be transmitted;

an emission varactor VE1 controlling the phase of said microwave signal and constituting said phase control member;

an emission laser LE1 emitting light which is modulated by said microwave signal and which constitutes one of said internal transformation members;

an optical wave detector DE1 for reconstituting the microwave signal, said detector constituting one of said peripheral transformation members; and an emission amplifier AE1 for feeding the antenna element EA1, with the gain of each of the analog amplifiers AE1, AE2, . . . , AEp being selected and optionally being individually controllable in order to adapt the radiation pattern.

It is also necessary to have an internal microwave waveguide HIE1 going from the emitter EH to the emission laser LE1, and a peripheral microwave waveguide HPE1 going from the detector DE1 to the ampifier AE1. The amplifier is connected to the antenna element EA1 via a directional coupler assembly HP1 including the members described with reference to FIG. 3. It must be understood that the above-mentioned members having the digit 1 at the ends of their references constitute examples corresponding to antenna element EA1. Each antenna element EAi corresponds to equivalent members whose references are terminated by the number i.

The reception path members are given analogous references but with the letter E being replaced by the letter R. In particular, for antenna element eA1, these members comprise:

a reception amplifier AR1 receiving the microwave signal picked up by said antenna element via the directional coupler assembly HP1;

a peripheral reception microwave waveguide HPR1;

a laser LR1 constituting one of said peripheral transformation members;

a reception interzone optical waveguide GR;

a reception detector DR1 constituting one of said internal transformation members;

a reception internal microwave waveguide HIR1 with a varactor VR1 constituting one of said phase control members; and a microwave receiver RH constituting said central member. The receiver sums together the signals it receives from the various different paths together with appropriate and optionally controllable weighting in order to adapt the shape of the reception radiation pattern of the antenna system.

Amplitude and phase control of n elementary sources, e.g. for emission purposes, is now examined.

One way of controlling n elementary sources would be to put the n emission and reception paths in parallel. Such a system would require n of each of the components in the chains: n emitters, n varactors, n modulators, etc. In particular it would be necessary to have 2n optical waveguides.

Figure 4:
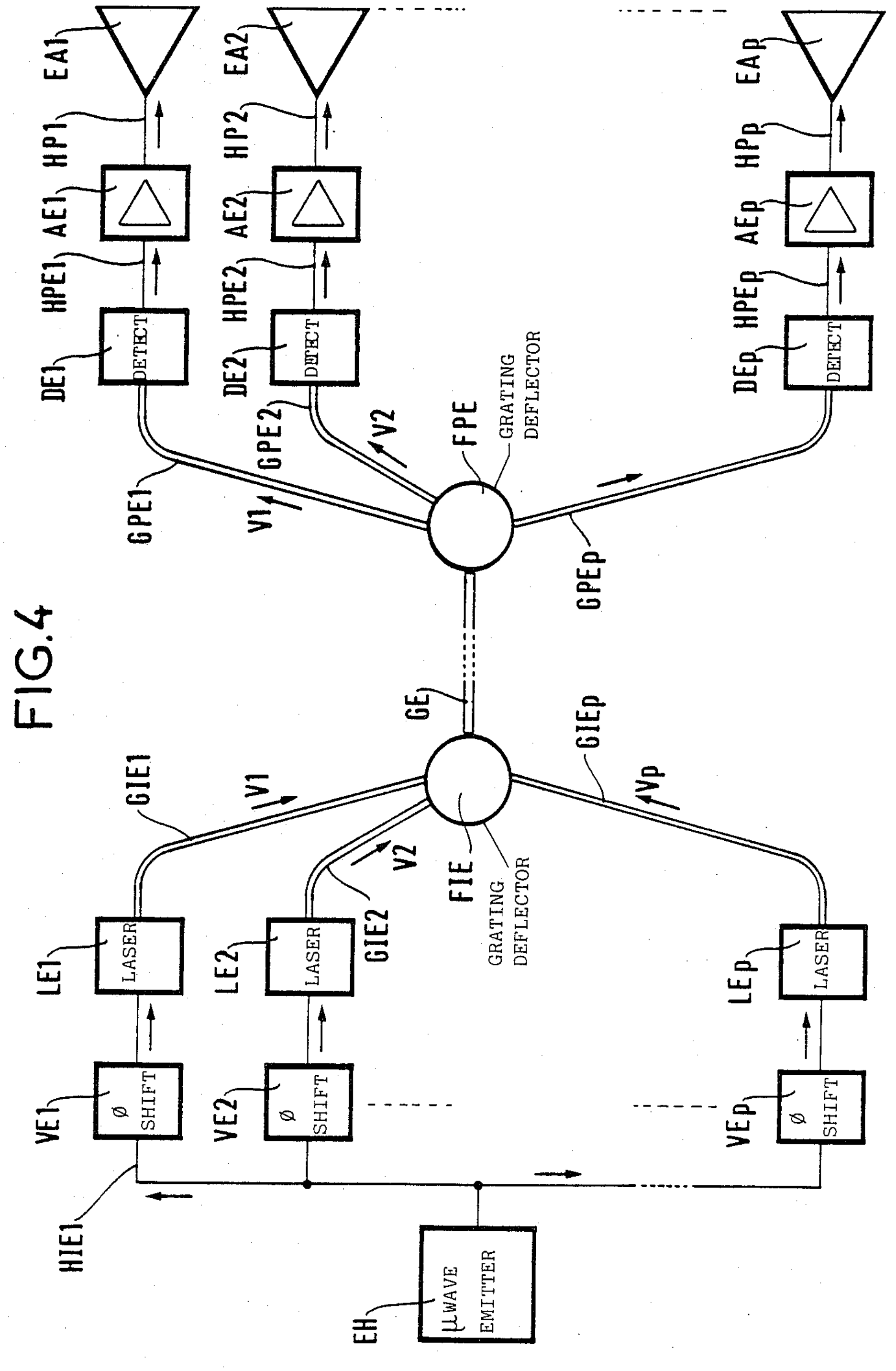
FIG. 4 is a block diagram of a group of composite emission paths in the same system.
Figure 5:
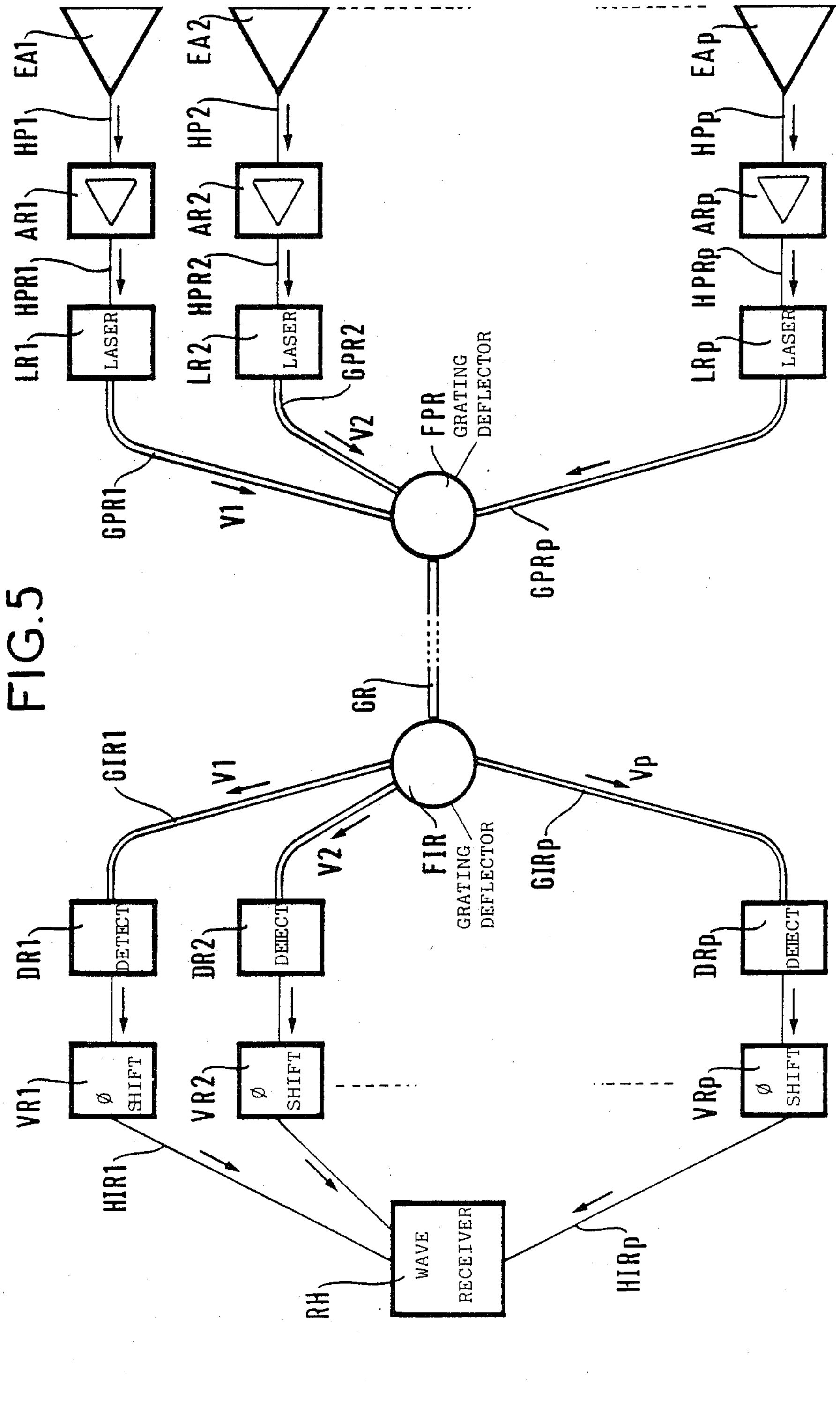
FIG. 5 is a block diagram of a group of reception paths in the same system.

The increase in the number of components with increasing n is a drawback which should not be overlooked. Although it is true that all of these components, apart from the optical waveguides, guides, can be made by collective methods, thereby making them reliable and cheap, there is nevertheless a considerable advantage in seeking to reduce the number of components in order to reduce the cost of the system. It is particularly useful to be able to reduce the number of interzone waveguides since they are relatively long and they occupy a substantial amount of space if they are numerous. The system in accordance with the invention reduces the numbers required of some of the components and in particular of the interzone waveguides. FIGS. 4 and 5 are diagrams showing the paths followed by the emission wave and by the reception wave, respectively.

The n antenna elements EA1, EA2, . . . , EAn are grouped together in groups of p elements, e.g. the elements eA1, EA2, . . . , EAp.

For emission purposes, a microwave emitter EH is common to all of the antenna elements EA1, EA2, . . . , EAp of a single group. It emits a microwave signal which is modulated by the information signal to be transmitted and this signal is received by p emission varactors VE1, VE2, . . . , VEp. These varactors apply phase shifts thereto corresponding to respective ones of said antenna elements. Each signal phase shifted in this way is used to modulate a semiconductor emission laser LE1, LE2, . . . , LEp whose power may correspond to the amplitide of the field to be radiated by the corresponding antenna element EA1, EA2, . . . , EAp. The emission frequencies of all of these lasers are different and each of them corresponds to one of the antenna elements.

They emit into respective optical waveguides GIE1, GIE2, . . . , GIEp, which converge on a frequency filter FIE. Said filter constitutes said internal emission deflector. It transmits light coming from the various waveguides to a common waveguide GE which connects the central zone which contains, in particular, the emitter EH, to a peripheral antenna zone where said circulators, amplifiers and antennas are to be found. This waveguide is said interzone guide.

On leaving this waveguide, the light signals at various different wavlengths are directed by a transmit peripheral deflector FPE likewise constituted by a filter to a plurality of corresponding optical waveguides GPE1, GPE2, .., GPEp which then direct them to a corresponding number of detectors DE1, DE2, . . . , DEp which are followed by a corresponding number of microwave amplifiers AE1, AE2, . . . , AEp. Each of these amplifiers feeds a corresponding antenna element EA1, EA2, . . . , EAp.

On reception, the signals received by the antenna elements are amplified at AR1, AR2, . . . , ARp and then modulate p corresponding lasers LR1, LR2, . . . , LRp which emit on the same frequencies as mentioned above into the optical waveguides GPR1, GPR2, . . . , GPRp. These waveguides converge on a filter constituting a receive peripheral deflector FPR which injects the corresponding light signals into a common interzone optical waveguide GR. A filter constituting a receive internal deflector FIR directs the light signals at the various frequencies to a corresponding number of waveguide GIR1, GIR2, . . . , GIRp.

The light signals are detected by detectors DR1, DR2, . . . , DRp, and the resulting microwave signals are phase shifted by the varactors VR1, VR2, . . . , VRp applying the respective phase shifts that correspond to the antenna elements EA1, EA2, . . . , EAp. These phase shifts are selected in such a manner that the signals phase shifted in this way are back with the same mutual phase relationships as they had when they were emitted by an external emitter which is at a distance from the present antenna system and which is aimed at by the present antenna system. These signals are received by a common microwave receiver RH. The receiver reconstitutes the information carried by the signals received by the antenna elements from the aimed-at external emitter.

The provision of the lasers LE1, LE2, . . . , LEp, LR1, LR2, . . . , LRp, calls for the following remarks:

By suitably adapting the composition of the materials from which semiconductors lasers are made, it is possible to obtain sources whose frequencies may be selected over the following range of wavelengths: 0.5 micrometers to 2 micrometers. In the current state of the art, it is possible to obtain about 20 sources at frequencies $V_1$, $V_2$, . . . , $V_p$. It is therefore possible to select p=20.

Two successive frequencies are separated by a difference dV. This gives dV/V=0.01, or thereabouts.

The selectivity required of the filters FIE, FPE, FPR, and FIR is therefore modest. They may be made by simple conventional techniques making use of gratings.

The simplification provided by the invention is substantial since it enables the number of microwave emitters EH, the number of microwave receivers RH, and the number of long waveguides to be divided by p or more. By virtue of this simplification, the system can be realized under conditions which are economically satisfactory in many cases.

Supposing that p=20, the numbers of components required in the system for n=10 and for n=100 can be evaluated as follows. Assume, for example, that the antenna has a diameter a=1 m, and that the wavelength L=5 cm. The values of $B_0$ and $B_1$ are given by equations 4 and 4'.

When n=10, the excursion $2B_1=0.15$ rad=10° in the vicinity of the normal.

The emission path requires 10 varactors, 10 modulated lasers, 10 detectors, and 10 amplifiers.

The received wave path also requires 10 amplifiers, 10 modulated lasers, 10 detectors, and 10 varactors.

When n=100, the excursion $2B_1=0.45$ rad=30° in the vicinity of the normal.

q long waveguides are required to connect the emitter EH to the antenna, where q=n/p=5.

As many long waveguides are required to connect the receiver to the antenna.

Ten long optical waveguides are therefore required in the system. This is a modest number and does not give rise to severe constraints of costs, bulk, or weight.

If the capabilities offered by the invention were not used, it will be necessary to have 200 such waveguides, and this could give rise to problems that would sometimes be insurmountable. Using the invention, only 5 emitters EH are required instead of 100. Similarly, only 5 receivers RH are required rather than 100.

However, it is still necessary to provide 100 varactors, 100 modulated lasers, 100 detectors, and 100 amplifiers along the emission path.

The received wave path also requires 100 amplifiers, 100 modulated lasers, 100 detectors, and 100 varactors.

Thus, electrical control of the amplitude and the phase of an antenna element EAi by modulating and detecting a laser wave at a frequency Vi selected from p frequencies makes a selfadapting system possible. The number of optical waveguides, of emitters, and of receivers is divided by p, while the number of other components remains the same.

In the above description, phase shifting is performed by an electronic method in a varactor. The phase-shifted microwave then modulates a laser LEi of frequency Vi. The amplitude of the wave radiated at EAi may be determined by the power of the laser, with the phase being determined by the varactor VEi.

Figure 6:
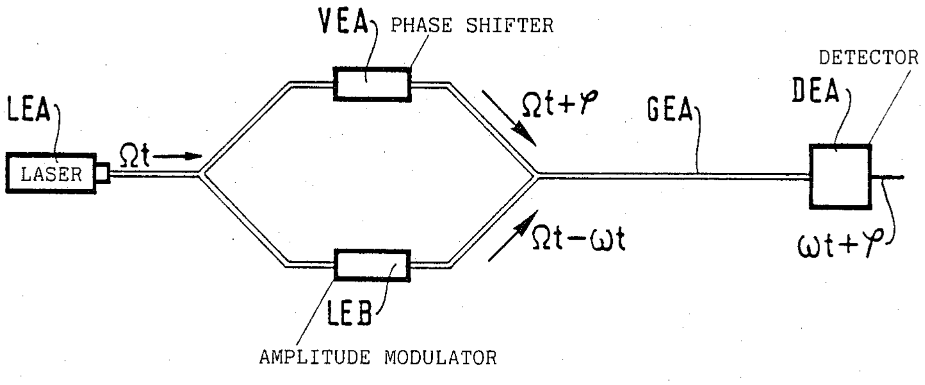
FIG. 6 is a block diagram of an optical portion of a composite path in a second system in accordance with the invention using an optical phase-controlling member, as a variant.

In a variant, these two operations may be performed by an optical method. This method is shown diagrammatically in FIG. 6 which is applicable to emission and should be compared with FIG. 1, with components that are more or less analogous having the same references except that the digit 1 is replaced by the letter A or B. A laser LEA emits light at an appropriate frequency (e.g. at a frequency Vi as mentioned above). This light is split and transmitted firstly to an electrically controlled optical phase shifter VEA which applies an appropriate phase shift thereto, and secondly to an amplitude modulator LEB which modulates it with a microwave signal which is itself modulated by the information signal to be transmitted.

The two resulting light beams are brought together in a long optical waveguide GEA and at the outlet therefrom the light signal is detected by a detector DEA. The detector reconstitutes the microwave signal applied to the modulator LEB together with the phase shift provided by the phase shifter VEA. This microwave signal can then be used in the same manner as the signal provided by the detector DE1.

An analogous method may be applied to reception.

If the optical modulator introduces a phase shift which has been selected for the elementary source EAi, then the microwave is phase shifted by the desired amount.

This possibility will be appreciated when there is a special problem to be solved.

We claim:

1. In an improved adaptive antenna system for radio waves, said system comprising:

an antenna having a plurality of antenna elements distributed over a surface in a peripheral zone of said antenna system, each of said elements receiving a respective portion of a peripheral radio signal and emitting a corresponding portion of external radiation energy from said antenna system, and/or each of said antenna elements receiving a respective portion of external radiation energy received by said antenna system and supplying a corresponding peripheral radio signal, said peripheral radio signals propagating within said antenna system and having a common predetermined radio frequency, said external radiation energy portions being portions of the energy of an external radiation having said common radio frequency and propagating in external free space along an aiming direction, and a plurality of composite lines respectively corresponding to said antenna elements, each of said composite lines comprising:

a pheripheral radio waveguide for transmitting said peripheral radio signal;

a peripheral transformation member disposed on said peripheral waveguide to couple said peripheral radio signal to a light signal corresponding to said antenna element, said coupling being performed by modulating or demodulating said light signal;

an interzone optical waveguide having a peripheral end and an internal end for transmitting said light signal between said peripheral zone and internal zone of said antenna;

an internal transmformation member for coupling said light signal by demodulation or modulation to an internal radio signal also corresponding to said antenna element;

an internal radio waveguide for transmitting said internal radio signal; and at least one phase control member for controlling the phase of said peripheral radio signal relative to said internal radio signal, said antenna system further comprising:

a central member for emitting and/or receiving said internal radio signals to and/or from said internal radio waveguides; and means for controlling said phase control members for setting phases in said composite lines such that all said external radiation energy portions are coupled in phase at said central member through corresponding composite lines for external radiation propagating along a controlled particular aiming direction, whereby said antenna system is adapted to said particular aiming direction, the improvement wherein said interzone optical waveguide is common to said plurality of said composite lines;

said light signals in said plurality of composite lines have a plurality of respective light frequencies; and said antenna system further includes a peripheral deflector and an internal deflector at said peripheral end and said internal end of said common interzone optical waveguide, respectively, which deflectors are light frequency sensitive for deflecting light through a plurality of angles corresponding respectively to said plurality of light frequencies so as to couple said common interzone optical waveguide to said pheriperal and internal tranformation members of said plurality of composite lines, respectively.

2. A system according to claim 1, wherein said antenna elements are bidirectional elements capable of both emitting and receiving said external wave energy, the system including in conjunction with each of said antenna elements:

a bidirectional peripheral radio waveguide connected to said element;

an emission peripheral radio waveguide;

a reception peripheral radio waveguide; and a circulator for coupling said emission waveguide to said bidirectional waveguide for emission radio signals, and for coupling said bidirectional waveguide to said reception waveguide for reception radio signals, said bidirectional, emisson and reception peripheral waveguides and said circulator corresponding to two of said composite paths, namely an emission path and a reception path, and both of said paths having said bidirectional peripheral radio waveguide and said circular in common, with said emission peripheral radio waveguide belonging only to said emission path and said reception peripheral radio waveguide belonging only to said reception path.

3. A system according to claim 1, wherein said wave energy, said signals, and said radio waveguides are all at microwave frequencies.

4. A system according to claim 1, wherein said phase control member is an optical phase shifter placed on an optical phaseshifting length of each of said composite paths, said length receiving a light signal at a frequency specific to said path, said internal transformation member amplitude modulating or demodulating an equivalent light signal on a transformation optical length connected in parallel with said phase-shifting length.

* * * * *